June 20, 1967  H. KRAUS  3,326,050
COMBINED SPECIFIC GRAVITY METER AND CONTACT GONIOMETER
Filed Oct. 15, 1964  2 Sheets-Sheet 1
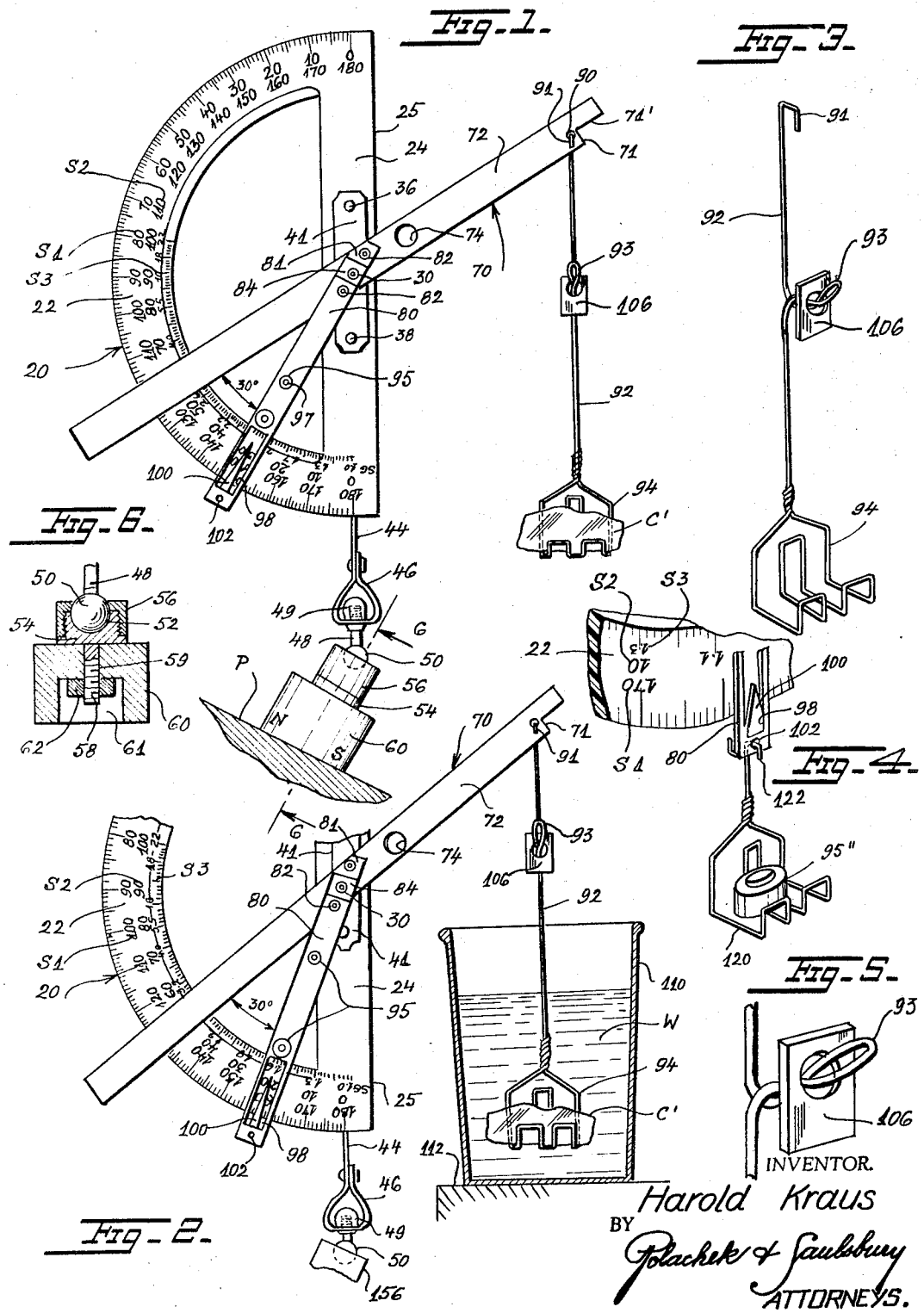
INVENTOR.
Harold Kraus
BY Polachek & Saulsbury
ATTORNEYS.

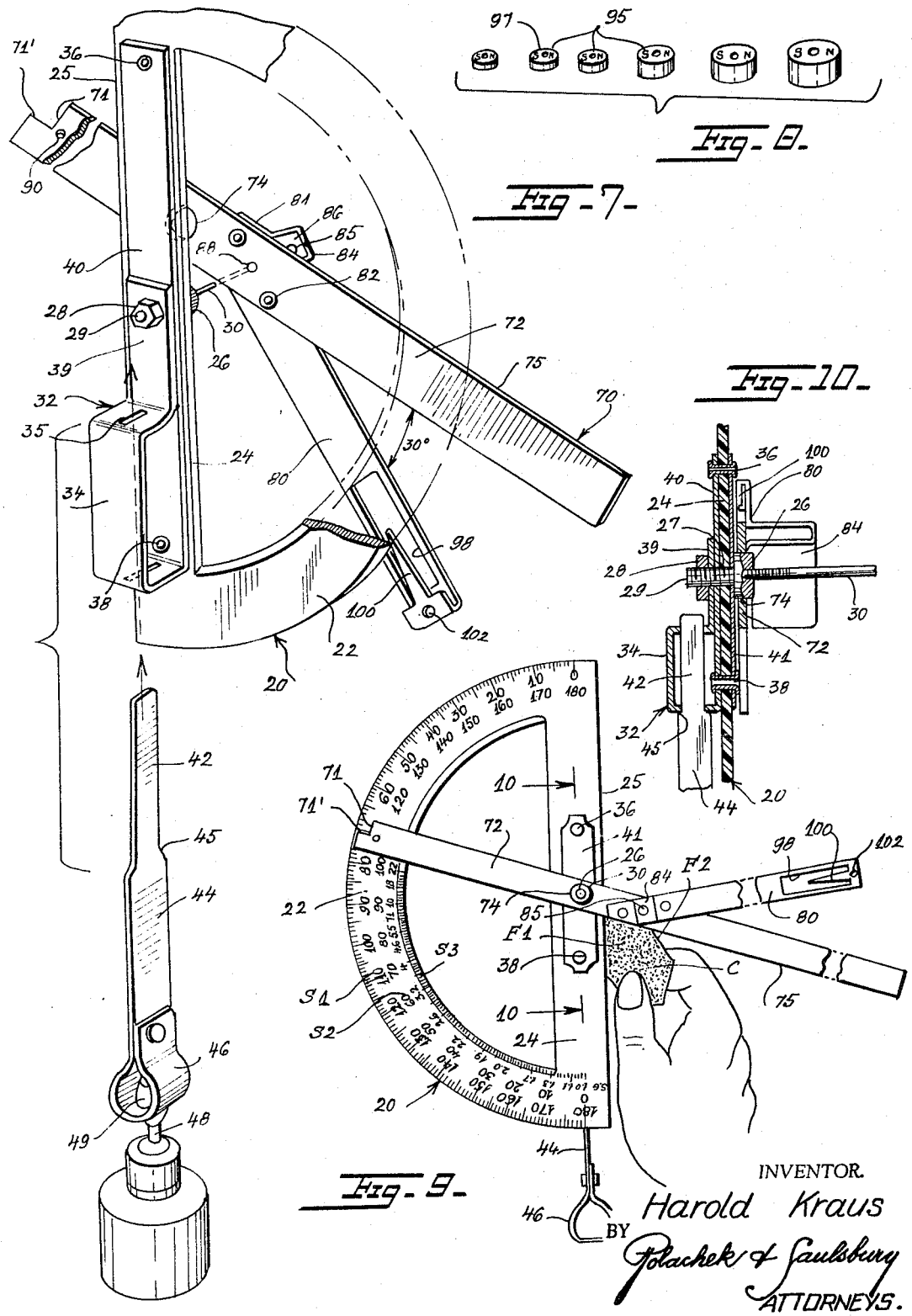

United States Patent Office 3,326,050
Patented June 20, 1967

3,326,050
COMBINED SPECIFIC GRAVITY METER AND
CONTACT GONIOMETER
Harold Kraus, 749 Larch Ave., Teaneck, N.J. 07666
Filed Oct. 15, 1964, Ser. No. 403,981
8 Claims. (Cl. 73—437)

This invention relates to the art of measuring instruments and more particularly concerns a combined specific gravity meter and contact goniometer.

The invention has particular applicability to measuring crystals, ore samples, specimens of rocks and the like. According to the invention there is provided a device which is more sensitive than instruments of this type generally used in the field for measuring crystals of quartz and other substances of crystalline character, igneous rocks, etc. The device is relatively simple in construction, small in size and portable. It includes a novel lever pivotally mounted on a protractor which in turn is carried by a novel magnetic support. The lever, protractor and support are all detachable from each other and can be packed in a suitable carrying case for ready portability.

The protractor of the device is calibrated so that it is direct reading for specific gravity. In addition, the protractor is calibrated for direct reading of angles between an arm of the lever and a crossbar of the protractor. The device is provided with a basket which holds a specimen whose specific gravity is to be measured. Magnetic weights are provided to counterbalance the loaded basket prior to making the specific gravity reading. The loaded basket is then inserted into a container of water and the loss of weight of the loaded basket is indicated directly by a pointer on the lever at the specific gravity scale of the device. The lever can be removed from its pivot point on the protractor and moved to another pivot point for use of the lever and protractor as a direct reading contact goniometer to measure the solid angle between faces of a crystalline specimen.

It is therefore a principal object of invention to provide a specific gravity measuring device including a protractor calibrated to read specific gravity, a novel lever with an angularly disposed arm carrying a pointer, a novel spring mounting for the protractor, a magnetic base, and universal joint or swivel connection between the spring mounting and base.

A further object is to provide a device of the character described, wherein the protractor, lever and spring mounting are all detachable from each other.

A further object is to provide a device as described wherein the lever and protractor serve as a contact goniometer.

Another object is to provide a device as described, wherein the lever is shiftable on the protractor to a pivot point where it cooperates with the protractor in measuring angles between the lever and a crossbar of the protractor.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a device embodying the invention.

FIG. 2 is a fragmentary side elevational view of the device shown determining the specific gravity of a rock sample.

FIG. 3 is a perspective view of a basket for supporting a crystal or rock sample in the device.

FIG. 4 is a fragmentary perspective view of a basket and weight useful for weighting the lever of the device.

FIG. 5 is a perspective view of a weight used to compensate for the mass of the weighing basket in determining specific gravity of a rock sample or crystal.

FIG. 6 is a sectional view taken on line 6—6 of FIG. 2.

FIG. 7 is an exploded rear perspective view of parts of the device, taken on an enlarged scale, parts being broken away.

FIG. 8 is a perspective view of a plurality of magnetic weights useful in operating the device.

FIG. 9 is a side elevational view of the device being used as a direct reading contact goniometer.

FIG. 10 is a sectional view taken on line 10—10 of FIG. 9.

Referring to the drawings, there is shown in FIGS. 1, 2, 4, 7, 9 and 10, a protractor 20 having a semicircular arc or section 22 and a diametral integral crossbar 24 joining opposite ends of the arc. Bar 24 has a straight edge 25. The arc 22 is provided with an outer scale S1 reading counterclockwise in angular degrees from 0° to 180°, an intermediate scale S2 reading clockwise in angular degrees from 0° to 180°, and an inner scale S3 with specific gravity readings from 1.0 to 22 coordinated with the angular readings of scale S2.

At the center of crossbar 24 is a cylindrical stud 26 with a threaded bolt 29 inserted in a hole 27 in the crossbar and secured by a nut 28 on the back of the protractor; see FIGS. 7 and 10. The stud 28 supports a fine pin 30 extending axially therefrom at the front of the protractor. On the rear of the protractor is a bracket 32 formed from a strip of metal bent to form a rectangular loop 34 having slots 35 at upper and lower ends. The bracket is secured by eyelets or rivets 36, 38 to the crossbar above and below the bolt 29 and nut 28. The bolt 29 passes through registering holes in juxtaposed arms 39, 40 of the bracket and nut 28 bears on the rearside of arm 39 just above the loop 34. A reinforcement plate 41 is applied to the front of bar 24 to receive eyelets 36, 38.

The upper narrow end 42 of a flat spring strip or mounting bar 44 can be inserted through aligned slots 35 in loop 34. This bar has shoulders 45 which engage just under the loop to support the protractor in a vertical plane with the crossbar longitudinally vertical. The lower end of strip 44 is formed with a spring loop 46. At the bottom of this loop is a hole through which extends a threaded stud 48 on which engages cap nut 49. The nut holds strip 44 on stud 48. The lower end of stud 48 is formed with a ball 50 adjustably positionable in a spherical seat or socket 52 formed on an insert 54 screwed into a universal joint casing 56. The insert 54 has a depending threaded bolt 58 which extends through a bore 59 in a cylindrical magnet 60. The bolt terminates in a recess 61 in the bottom of the magnet and a nut 62 is screwed on the bolt in the recess; see FIG. 6. It will be apparent from the inspection of FIG. 1 that magnet 60 can be attached to any inclined magnetic surface P to which the magnet will cling magnetically or can be placed on any nonmagnetic substantially horizontal surface. In any case the massive magnet will serve as a stationary base for the protractor and will hold it in a vertical plane with the crossbar vertical.

The device includes a novel lever 70 including a straight flat bar 72 having a rectangular notch 71 at one end to provide direct reading of angles on scale S1 when the device is used as a contact goniometer as shown in FIG. 9. The bar 72 has a hole 74 which can be fitted on stud 26. A crystal C can be placed in the crotch defined between straight edge 25 of the crossbar 24 and straight edge 75 of bar 72. The angle defined between adjacent faces F1, F2 of the crystal C will be indicated on scale S1 at the position of central edge 71′ of the notch 71. In this way the device serves as a contact goniometer. It will be noted that the fine pin 30 is not used as a support for the bar 72 in this operation. If desired, the pin 30 can be made as a separate member with a threaded end. The pin can be unscrewed from the stud 26 when the pin is not required for use, to protect it from damage.

On the front of the bar 72 is mounted an angularly disposed arm 80. Arm 80 is 30° to bar 72. This arm has an end 81 secured by eyelets or rivets 82 to the bar 72. At end 81 is formed a rectangular loop 84 having a hole 85 in its bight 86 aligned with a hole 88 formed at the center of bar 72. Holes 85, 88 receive pin 26 for supporting the lever 70 pivotally upon the pin. At the outer notched end 71 of bar 72 is a hole 90 in which can be engaged a hook 91 at the end of a wire 92 carrying a light wire basket 94; see FIGS. 1 and 3.

The bar 72 and arm 80 are preferably formed of light magnetic material such as stainless steel to which magnetic weights 95 can cling. The wire 92 and the integrally formed wire basket are preferably made of nonmagnetic material, such as brass, copper, etc. A hook or loop 93 is formed in wire 92 to support a compensating weight when the device is making specific gravity measurements.

Magnetic weights 95 may be small cylindrical masses of different axial lengths and diameters as shown in FIG. 8. A central hole 97 may be provided in each weight.

The outer end of arm 80 is formed with a rectangular opening 98 and bent over pointer 100 exposed in opening 98 to indicate specific gravity readings on scale S3. A hole 102 may be provided near the bent free end of the arm just beyond opening 98 for a purpose to be described.

To use the device for measuring specific gravity of a crystal, rock sample or other specimen C', the separable parts of the device will be assembled together as shown in FIGS. 1, 2 and 7. The base strip 44 will be inserted through slots 35 in bracket loop 34. Lever 70 will be pivotally mounted on pin 30 by insertion of the pin through aligned holes 86, 88 of the lever. The wire basket 94 will then be supported on the lever by engagement of loop 91 of wire 92 in hole 90 of arm 72. The protractor 20 will then be adjusted by turning it on the universal joint until it is disposed in a vertical plane with the tip of pointer 100 aligned with the 0° reading of scale S2.

The crystal C' to whose specific gravity with respect to water is to be determined will then be placed in basket 94 and one or more magnetized balancing weights 95 will be attached to arm 80.

In order to compensate for the loss in weight of the basket 48 when immersed in water, a small weight in the form of a plastic strip 106, shown in FIGS. 1, 2, 3 and 5, can be engaged on hook 93.

A tumbler 110 containing water W is then positioned on a support 112 as shown in FIG. 2 so that the specimen C' is immersed in the water. In order to break surface tension of the water on the specimen, the spring mounting strip 44 can be struck lightly to cause it to vibrate on spring loop 46. When vibration has stopped and the system has stabilized, the specific gravity of the specimen can be read directly from calibrated scale S3. Following is a typical table in which specific gravity readings are coordinated with the readings of the angular scale S2:

*Table I*

| Angular scale in degrees: | Specific gravity |
|---|---|
| 100 | |
| 96 | 22 |
| 95 | 18 |
| 94 | 16 |
| 93 | 14 |
| 92 | 12 |
| 91 | 11 |
| 90 | 10 |
| 89 | 9.2 |
| 88 | 8.5 |
| 87 | 7.9 |
| 86 | 7.6 |
| 85 | 7.1 |
| 84 | 6.7 |
| 83 | 6.3 |
| 82 | 6.1 |
| 81 | 5.8 |
| 80 | 5.5 |
| 79 | 5.3 |
| 78 | 5.0 |
| 77 | 4.9 |
| 76 | 4.8 |
| 75 | 4.6 |
| 74 | 4.5 |
| 73 | 4.4 |
| 72 | 4.2 |
| 71 | 4.1 |
| 70 | 4.0 |
| 69 | 3.9 |
| 68 | 3.8 |
| 67 | 3.7 |
| 66 | 3.6 |
| 65 | 3.5 |
| 64 | 3.45 |
| 63 | 3.4 |
| 62 | 3.3 |
| 61 | 3.2 |
| 60 | 3.15 |
| 59 | 3.1 |
| 58 | 3.0 |
| 56 | 2.9 |
| 54 | 2.8 |
| 52 | 2.7 |
| 50 | 2.6 |
| 48 | 2.5 |
| 46 | 2.4 |
| 43 | 2.3 |
| 41 | 2.2 |
| 40 | 2.15 |
| 38 | 2.1 |
| 35 | 2.0 |
| 32 | 1.9 |
| 30 | 1.85 |
| 29 | 1.8 |
| 25 | 1.7 |
| 21 | 1.6 |
| 18 | 1.5 |
| 14 | 1.4 |
| 10 | 1.3 |
| 7 | 1.2 |
| 4 | 1.1 |
| 0 | 1.0 |

Alternatively or in addition to applying the weights to bar 80, a small bent wire basket 120 shown in FIG. 4 can be used. Weights 95'' can be placed in this light wire basket and the basket 120 can then be attached to arm 80 by engaging hook 122 of the basket in hole 102 at the end of the arm.

The construction of the lever 70 with its angularly disposed branch arm is such that one end of bar 72 balances the other end and permits the arm 80 to hang vertically at the zero position of scale S2, without weighting. An exceedingly small force will be sufficient to displace the lever by turning it on horizontal pin 30.

The spring mounting of the protractor and lever permits it to be vibrated slightly to break surface tension on the specimen C' which would otherwise prevent a truly accurate reading.

It will be noted that no computations are required. The scale S3 is direct reading. Resort may be had to Table I if closer readings than are indicated on scale S3 are required. As the device is arranged, all specimens, large and small, make use of the same range of specific gravity readings on scale S3. Since the ratio of the weight of a specimen of particular material in air to its weight in water is the same regardless of its size, the same deflection of the lever 70 will occur from the 100° balance position, and the same readings of specific gravity will be obtained regardless of the size of the specimen.

The parts of the device can readily be taken apart and placed in a suitable case for safe portability. The protractor and lever can be used away from the mounting strip as a direct reading goniometer whenever required. The pin 30 is not used during such readings so that it can be removed if desired. In any case the pin does not serve as the pivot point when goniometer readings are made so that it cannot be damaged by such use.

The several parts are light in weight. They can be made to precise dimensions and will provide highly accurate readings to one or two decimal places. If desired, scale S1 can be omitted and scale S2 can be used with bar 72 in making the goniometer readings. Scale S3 can be omitted and scale S2 can be used for specific gravity readings. If scale S3 is omitted, then a table such as Table I should be provided to coordinate readings of the pointer 100 at scale S2 with specific gravity readings of the table.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A combined specific gravity measuring device and contact goniometer, comprising a flat protractor having a semicircular arc and a diametral crossbar integrally joined to opposite ends of said arc, a bracket on one side of the crossbar, spring mounting means engageable with said bracket for vibratably supporting said protractor, a massive base, a universal joint connecting said base and spring mounting means so that the protractor can be adjustably disposed in a vertical plane, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, and a pointer on said arm movable over said scale for indicating the specific gravity of said specimen when the basket and specimen are immersed in water.

2. A combined specific gravity measuring device and contact goniometer, comprising a flat protractor having a semicircular arc and a diametral crossbar integrally joined to opposite ends of said arc, a bracket on one side of the crossbar, spring mounting means engageable with said bracket for vibratably supporting said protractor, a massive base, a universal joint connecting said base and spring mounting means so that the protractor can be adjustably disposed in a vertical plane, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, and a pointer on said arm movable over said scale for indicating the specific gravity of said specimen when the basket and specimen are immersed in water, said base being made of magnetized material so that the base can be detachably secured to a magnetic surface.

3. A combined specific gravity measuring device and contact goniometer, comprising a flat protractor having a semicircular arc and a diametral crossbar integrally joined to opposite ends of said arc, a bracket on one side of the crossbar, spring mounting means engageable with said bracket for vibratably supporting said protractor, a massive base, a universal joint connecting said base and spring mounting means so that the protractor can be adjustably disposed in a vertical plane, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, and a pointer on said arm movable over said scale for indicating the specific gravity of said specimen when the basket and specimen are immersed in water, said arm being made of magnetic material, said means for weighting the arm including a plurality of magnetized weights magnetically attachable to said arm in various positions for disposing the lever in said predetermined balanced position.

4. A combined specific gravity measuring device and contact goniometer, comprising a flat protractor having a semicircular arc and a diametral crossbar integrally joined to opposite ends of said arc, a bracket on one side of said crossbar, spring mounting means engageable with said bracket for vibratably supporting said protractor in a vertical plane, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, and a pointer on said arm movable over said scale for indicating the specific gravity of said specimen when the basket and specimen are immersed in water, said arm being made of magnetic material, said means for weighting the arm including a plurality of magnetized weights magnetically attachable to said arm in various positions for disposing the lever in said predetermined balanced position.

5. A combined specific gravity measuring device and contact goniometer, comprising a flat protractor having a semicircular arc and a diametral crossbar integrally joined to opposite ends of said arc, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, a second scale on said arc calibrated directly in specific gravity with readings coordinated directly with the angular graduations of the first-named scale, and a pointer on said arm movable over the second scale for indicating therewith the specific gravity of said specimen when the basket and specimen are immersed in water, a bracket on one side of the crossbar, spring mounting means engageable with said bracket for vibratably supporting the protractor to break water surface tension on said specimen, a massive base, and a universal joint connecting said base and spring mounting means so that the protractor can be adjustably disposed in a vertical plane.

6. A combined specific gravity measuring device and contact goniometer, comprising a flat protractor having a semicircular arc and a diametral crossbar integrally joined to opposite ends of said arc, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, a second scale on said arc calibrated directly in specific gravity with readings coordinated directly with the angular graduations of the first-named scale, and a pointer on said arm movable over the second scale for indicating therewith the specific gravity of said specimen when the basket and specimen are immersed in water, a bracket on one side of the crossbar, spring mounting means engageable with said bracket for vibratably supporting the protractor to break water surface tension on said specimen, a massive base, and a universal joint connecting said base and spring mounting means so that the protractor can be adjustably disposed in a vertical plane, and means attachable to said support means for weighting the basket to compensate for loss of weight of the basket when it is immersed in water.

7. A combined specific gravity measuring device and contact goniometer, comprising a flat protractor having a semicircular arc and a diametral crossbar integrally joined to opposite ends of said arc, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, a second scale on said arc calibrated directly in specific gravity with readings coordinated directly with the angular graduations of the first-named scale, and a pointer on said arm movable over the second scale for indicating therewith the specific gravity of said specimen when the basket and specimen are immersed in water, a bracket on one side of the crossbar, spring mounting means engageable with said bracket for vibratably supporting the protractor to break water surface tension on said specimen, a massive base, and a universal joint connecting said base and spring mounting means so that the protractor can be adjustably disposed in a vertical plane, and means attachable to said support means for weighting the basket to compensate for loss of weight of the basket when it is immersed in water, said arm being made of magnetic material, said means for weighting the arm including a plurality of magnetized weights magnetically attachable to said arm in various positions for disposing the lever in said predetermined balanced position.

8. A combined specific gravity measuring device and contact goniometer, comprising a flat protractor having a semicircular arc and a diametral crossbar integrally joined to opposite ends of said arc, a scale on said arc graduated in degrees, a stud centrally located on said crossbar, and a pin extending axially from said stud; a lever having a straight lever bar with an opening thereon rotatably engageable on said stud so that goniometric measurements of angles between said crossbar and one end of said lever bar are indicated by the other end of said lever on said scale; an arm secured to the center of said lever bar at an acute angle thereto, said lever bar and arm having aligned holes for receiving said pin so that the lever is pivotally mounted thereon, a basket for supporting a specimen whose specific gravity is to be measured, said arm assuming a vertical position at the crossbar when the basket is unloaded, support means connected to the basket and attachable to said one end of the lever bar, means for weighting said arm so that the lever assumes a predetermined balanced position at the protractor when the basket is loaded with said specimen, a second scale on said arc calibrated directly in specific gravity with readings coordinated directly with the angular graduations of the first-named scale, and a pointer on said arm movable over the second scale for indicating therewith the specific gravity of said specimen when the basket and specimen are immersed in water, a bracket on one side of the crossbar, spring mounting means engageable with said bracket for vibratably supporting the protractor to break water surface tension on said specimen, a massive base, and a universal joint connecting said base and spring mounting means so that the protractor can be adjustably disposed in a vertical plane, a light wire weight attachable to said support means for weighting the basket to compensate for loss of weight of the basket when it is immersed in water, said base being made of mass magnetized material so that the base can be detachably secured to a magnetic surface, said arm being made of magnetic material, said means for weighting the arm including a plurality of magnetized weight magnetically attachable to said arm in various positions for disposing the lever in said predetermined balanced position.

References Cited

UNITED STATES PATENTS

| 655,004 | 7/1900 | Penfield | 33—99 |
| 1,257,662 | 2/1918 | Young | 73—437 |
| 1,222,919 | 4/1917 | Bennett | 73—433 |
| 1,934,223 | 11/1931 | Booth | 248—181 |

FOREIGN PATENTS

| 724,579 | 2/1955 | England. |
| 492,361 | 2/1930 | Germany. |

RICHARD C. QUEISSER, *Primary Examiner.*

J. D. SCHNEIDER, *Assistant Examiner.*